Feb. 24, 1953 G. A. FINDER Re. 23,620
MUSICAL INSTRUMENT CONSTRUCTION
Original Filed July 15, 1950 3 Sheets-Sheet 1
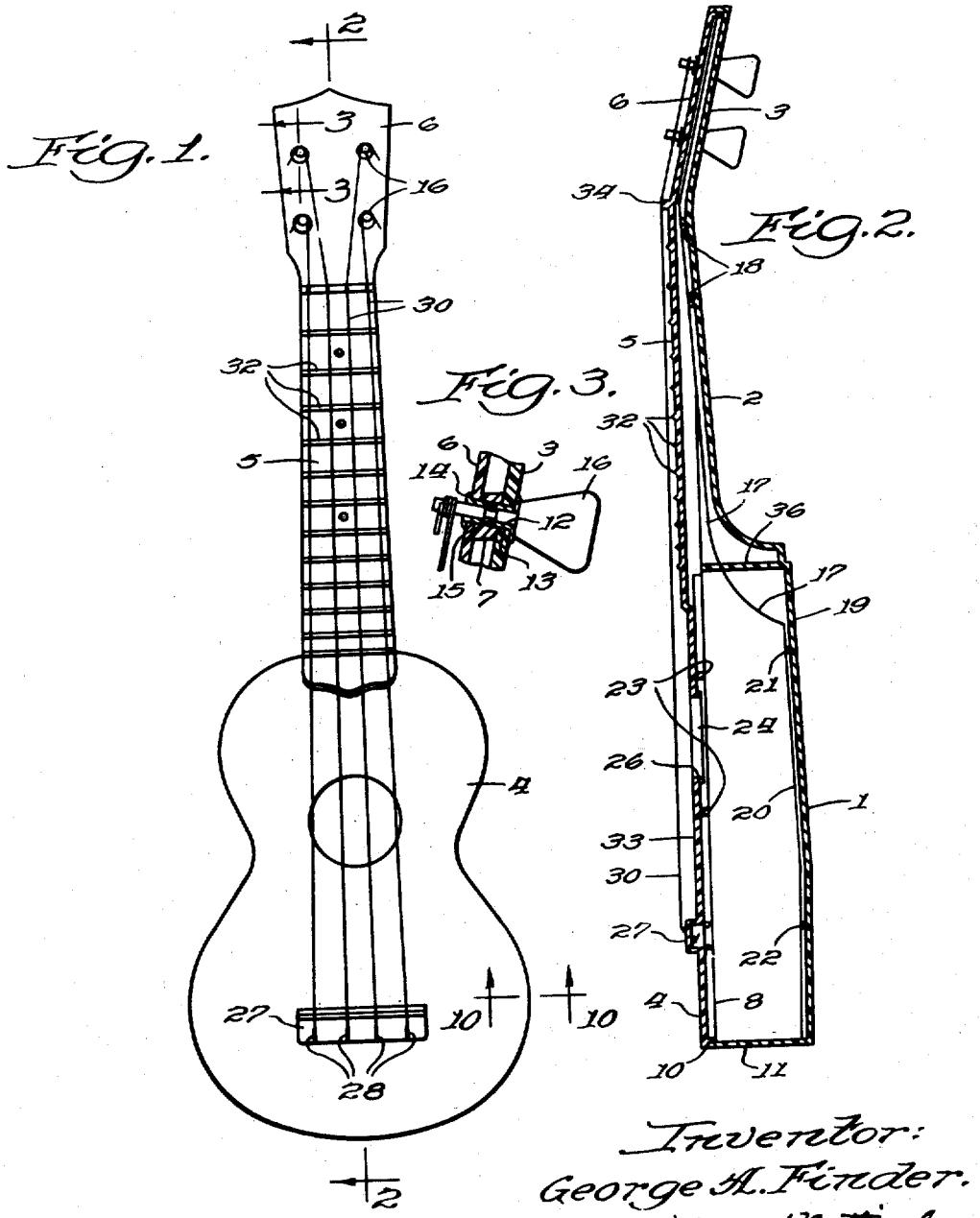
Inventor:
George A. Finder.
By Fulwider and Mattingly
Atty's.

Feb. 24, 1953 G. A. FINDER Re. 23,620
MUSICAL INSTRUMENT CONSTRUCTION
Original Filed July 15, 1950 3 Sheets-Sheet 2
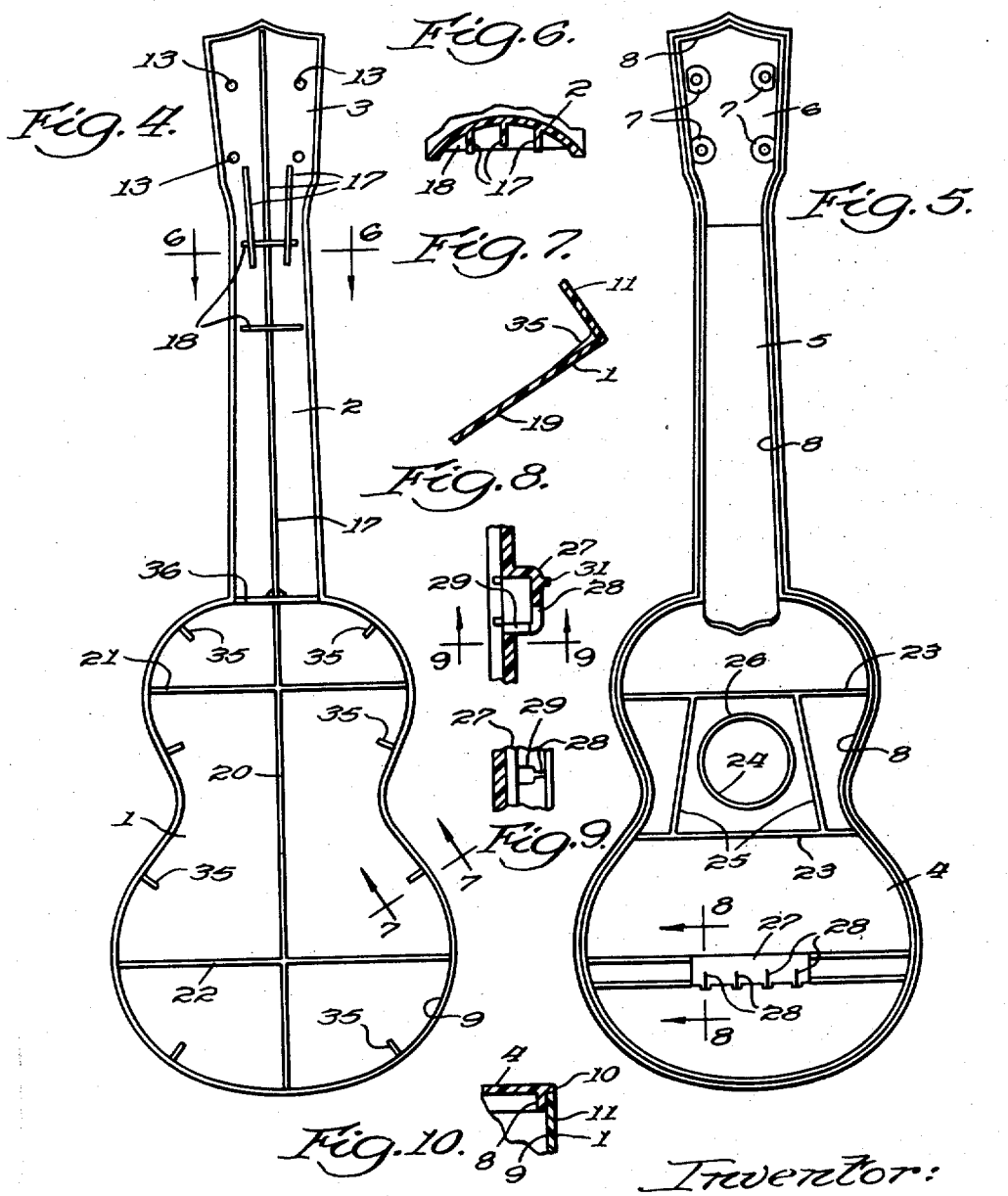
Inventor:
George A. Finder.
By Fulwider and Mattingly
Attys.

MUSICAL INSTRUMENT CONSTRUCTION
Original Filed July 15, 1950 3 Sheets-Sheet 3
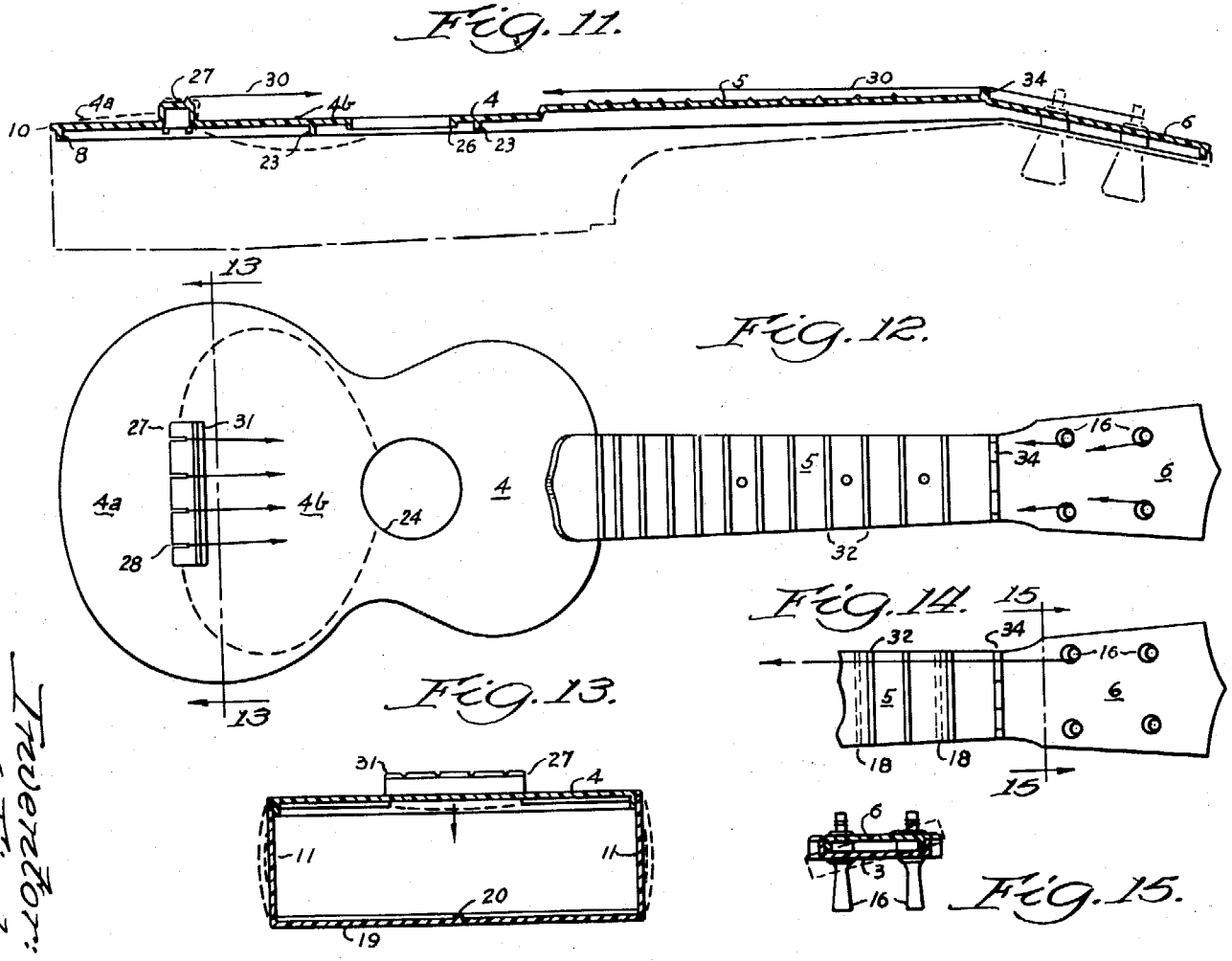
Inventor:
George A. Finder.
By Fulwider and Mattingly
Attys.

Reissued Feb. 24, 1953 Re. 23,620

UNITED STATES PATENT OFFICE 23,620

MUSICAL INSTRUMENT CONSTRUCTION

George A. Finder, San Diego, Calif., assignor to Fin-der Inc., San Diego, Calif., a corporation of California Original No. 2,588,101, dated March 4, 1952, Serial No. 174,095, July 15, 1950. Application for reissue July 28, 1952, Serial No. 306,520

18 Claims. (Cl. 84—291)

Matter enclosed in heavy brackets [ ] appears in the original patent but forms no part of this reissue specification; matter printed in italics indicates the additions made by reissue.

My invention relates to a musical instrument construction, more particularly to the construction of stringed musical instruments, and the objects of my invention are:

First, to provide a musical instrument construction which promotes injection molding of various musical instruments of plastic material;

Second, to provide a musical instrument construction in which a complete stringed musical instrument may be formed of two castings by addition of strings and keys;

Third, to provide a musical instrument construction of this class having very fine acoustical arrangement when constructed of two plastic castings;

Fourth, to provide a musical instrument construction of this class which provides an instrument which is very durable, impervious to water and numerous solvents, and which will withstand very great temperature variations;

Fifth, to provide a musical instrument construction of this class having novel top and integral bridge construction for holding the strings of the musical instrument;

Sixth, to provide a musical instrument construction of this class having a novel key-holding structure in the head thereof;

Seventh, to provide a musical instrument construction of this class having novel reinforcing structure cast therein which permits the instrument to be very light in weight in proportion to its strength;

Eighth, to provide a musical instrument construction of this class in which the neck is integral with the body and the finger board is integral with the top, providing a structure which is very easy to assemble, promoting economy of manufacture;

Ninth, to provide a musical instrument construction of this class in which the musical instrument is substantially completed by the assembly of two castings, having novel indexing flanges which provide accurate interengagement of the two castings, which greatly facilitates the assembly thereof; and, Tenth, to provide a musical instrument construction of this class which is very simple and economical, efficient, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Figure 1 is a top or plan view of a musical instrument, more particularly a ukulele, incorporating my musical instrument construction;

Figure 2 is a longitudinal sectional view thereof, taken from the line 2—2 of Figure 1;

Figure 3 is an enlarged fragmenary sectional view, taken from the line 3—3 of Figure 1;

Figure 4 is a top or plan view of the lower body casting of my musical instrument construction;

Figure 5 is a bottom plan view of the upper top and finger board casting of my musical instrument construction;

Figure 6 is an enlarged fragmentary sectional view, taken from the line 6—6 of Figure 4;

Figure 7 is an enlarged fragmentary sectional view, taken from the line 7—7 of Figure 4;

Figure 8 is an enlarged fragmentary sectional view, taken from the line 8—8 of Figure 5;

Figure 9 is a fragmentary sectional view, taken from the line 9—9 of Figure 8; [and]

Figure 10 is an enlarged fragmentary sectional view, taken from the line 10—10 of Figure 1;

*Figure 11 is a vertical cross-sectional view of the top of my instrument showing on an exaggerated scale by dotted line the distorted position it tends to assume when subjected to tension by the strings mounted thereon;*

*Figure 12 is a plan view of the device, with the area defined by dotted lines tending to assume a concave shape when the top of the instrument is subjected to the tension of the strings thereof;*

*Figure 13 is a vertical cross-sectional view of the instrument taken on the line 13—13 of Figure 12, showing the position in dotted lines which the top and side walls tend to assume when the strings of the instrument are under tension;*

*Figure 14 is a fragmentary plan view of the neck portion of the instrument showing the transverse reinforcing used to prevent torsional twist thereof as the strings are subjected to tension in sequence; and,*

*Figure 15 is a vertical cross-sectional view of the neck of the instrument taken on the line 15—15 of Figure 14 showing by dotted line the position the neck tends to assume when the strings thereon are under unequal tension.*

*As is well known in the art, when a stretched string under proper tension is vibrated it will produce a musical tone, and the volume of the musical tone so produced is in direct ratio to the vol-*

*ume or quantity of air set in motion by the string vibration. As the area of a vibrating string is relatively small, it will be apparent that a string alone is not an efficient sound producer. Consequently, for a vibrating string to produce a musical tone of any volume it is necessary that it be combined with a sounding board, preferably in combination with a hollow ported body.*

*In the ukulele, which is a small version of a guitar, the musical tone produced by a vibrating string is amplified by the use of both a sounding board and a hollow ported body. In the ukulele construction the string vibrations are transmitted by means of a combination bridge and tail piece to the top of the body, and the body cavity is coupled to the outside air through an opening which serves as a resonator.*

*For a stringed instrument such as a guitar or ukulele to produce the higher truer musical tones, it is essential that the body top thereof be of minimum weight and thickness whereby it will vibrate in unison with the instrument strings in order to produce such tones. However, it is equally important that the top and body of the instrument be of such a construction that there is no appreciable deformation thereof when the strings are subjected to tension or when the tension is varied thereon, for otherwise it is difficult, if not impossible, to accurately tune the instrument. My invention provides a stringed instrument construction which accurately reproduces the higher, truer musical tones by vibration of the strings thereof, and one which has no appreciable body distortion when the strings are subjected to tension.*

[Similar characters of reference refer to similar parts and portions throughout several views of the drawings.]

In my musical instrument construction, I have provided two separate castings, which are preferably made by the injection molding process, and of plastic material. One of the castings, as shown in Figure 4 of the drawings, incorporates the musical instrument body 1, having an integral arcuate in cross-section neck 2, which includes a key-supporting head portion 3. The other casting, shown in Figure 5 of the drawings, incorporates a top 4, having an integral finger board portion 5, and cover portion 6, provided with projecting key-receiving bosses 7, which are integral therewith. Spaced from the outer outline edge portions of the top casting 4 are angular flange portions 8, shown in detail in Figure 10 of the drawings, which engage the internal side wall portions 9 of the body 1, greatly facilitating the assembly of the castings 1 and 4, and strengthening the structural connection thereof.

It will be noted that the spacing of the angular flange 8 from the outer edge 10 of the top casting 4, as shown in Figure 10 of the drawings, is equal to the thickness of the side wall 11 of the body casting 1, all as shown best in Figure 10 of the drawings. It will be noted that the top casting 4 and body casting 1 are assembled by providing a coating of solvent cement adjacent the flange 8, so that after assembly the castings 1 and 4 become substantially integral. The assembly of the castings 1 and 4 is therefore very simple, and requires only the placement of the cement on the outer side of the flange 8 preliminary to the fitting of the top casting 4 on to the body casting 1, shown in detail in Figure 10 of the drawings. During the assembly of the top casting 4 with the body casting 1, solvent cement is placed on the ends of the bosses 7 which abut the head portion 3 of the body casting 1, shown best in Figure 3 of the drawing. Thus, the bosses 7 are adhered to the head portion 3, as shown in Figure 3 of the drawings, then the bushing 12 is pressed into the opening 13 in the head portion 3, and forced into the boss 7. A metal eyelet 14 is pressed into the opening 15 in the boss 7, and the key holding structure is complete.

Reference is made to my co-pending application for String Holding Key for Musical Instruments, Serial No. 155,031, filed April 10, 1950, now matured into U. S. Patent No. 2,583,478, dated January 22, 1952, which discloses the details of the keys 16 and bushings 13 in relationship to the head of a musical instrument.

The neck portion 2 of the body casting 1, as shown in Figures 4 and 6 of the drawings, is arcuate in cross-section and is provided with a plurality of longitudinal stiffeners 17, which are integral with the neck portion 2 and with the chord-shaped transverse stiffeners 18, providing rigidity of the neck portion 2 of the body casting 1. It will be noted that the middle longitudinal stiffener 17 extends to the body portion of the body casting 1, and is integral with a transverse partition 36, which is disposed at the transition between the neck portion 2 and the body portion of the body casting 1. This middle reinforcing portion 17 extends beyond said partition 36, as shown in Figure 2 of the drawings, and is integral with the bottom 19 of the body casting 1, shown best in Figure 2 of the drawings. It will be noted that this reinforcing portion 17 provides rigidity of the neck 2 for supporting strings under tension on the musical instrument.

In the body casting 1, integral with the bottom 19 thereof, and extending the full length of the bottom 19, is a reinforcing rib 20, which is in alignment with the reinforcing rib 17 and transversely of this reinforcing rib 20 are the reinforcing ribs 21 and 22, all of which serves to stiffen the back 19 of the body member 1.

The top casting 4, as shown in Figure 5 of the drawings, is provided with a plurality of reinforcing ribs 23, which extend laterally of the longitudinal axis of the top casting 4, at opposite sides of the sound hole 24, and interconnecting these ribs 23 are secondary reinforcing ribs 25 at opposite sides of the sound hole 24, at an acute angle to the longitudinal axis of the top casting 4. Surrounding the sound hole 24 is a reinforcing rib 26, which is annular, as shown best in Figures 2 and 5 of the drawings. The top casting 4 is provided with an integral string-holding bridge 27, shown in Figure 2 of the drawings in section, and in detail in Figures 8 and 9. This string-holding bridge is substantially channel-shaped in cross-section and is integral with the top casting 4, and is provided with string-supporting slots 28, which extend through the normally upper portion thereof and through the rear side wall of said channel-shaped in cross-section bridge 27. These slots 28 are each provided with an enlarged portion 29, through which the knot ends of strings may be inserted during the stringing of the instrument. It will be noted that the channel-shaped in cross-section bridge 27 is open inwardly of the musical instrument, as shown in Figure 2 of the drawings, providing room for the insertion of a knot on the strings 30, which engage the bar 31 of the bridge 27 in their extended relationship toward the keys 16, to which they are connected at their opposite ends.

The neck portion 5 of the top casting 4 is provided with accurately graduated finger-board frets 32, which are integral therewith and raised above the upper surface 33 of the top casting 4. At the extreme end of the finger-board of the neck portion 5 is an integral nut 34, over which the strings pass in angular relationship to the keys 16. As shown in Figure 4 of the drawings, and in detail in Figure 7, the body casting side wall portions are provided with reinforcing ribs 35, which are integral with the side walls 11 and the back 19, for stiffening the construction of the body casting 1 at the transition of said side walls 11 and back 19.

The operation of my musical instrument construction is substantially as follows:

When the top casting 4 has been cemented to the body casting 1, as hereinbefore described, and when the keys 16 are in place as shown in Figures 1, 2 and 3 of the drawings, the strings 30 may be provided with knotted portions near their ends, which may be inserted through the enlarged openings 29 in the bridge 27, then the strings may be pulled over the bar 31 and the nut 34 to a position in connected relationship with the keys 16, whereupon they may be tightened to the proper pitch. When the stresses in the strings 30 reach the desired value to provide tone pitch, the various reinforcing ribs within the body casting 1 and top casting 4 resist deflection of the neck of the musical instrument relative to the body thereof *in a manner to be fully set forth hereinafter.*

The arcuate cross-section neck portion 2 of the body member 1 provides structural strength in its integral cemented relationship with the finger-board neck portion 5 of the top casting 4. The flange 8, as shown in Figure 10, which extends completely around the outline of the instrument, provides additional stiffening therefor, and the integral construction provided by the solvent cement connecting the body casting 1 and top casting 4 renders the instrument very strong and of a unitary resonant character.

*The stresses set up in the instrument of my invention when tension on the strings is varied or is applied thereto in the tuning of the instrument, are somewhat complex. First, there is a primary tendency for the instrument to deform along substantially the entire length of the longitudinal axis thereof, and assume a bow shape relative to the strings 30. Several secondary deformations also tend to occur in the instrument concurrently with said primary deformation.*

*As may be seen in Figure 1, the keys 16 are not disposed on the longitudinal axis of the ukulele, and as a result when tension is applied or varied in any way on separate strings 30, an unbalanced force condition exists that tends to cause rotation of the neck 2 and keyboard 5 about their longitudinal axis from the position shown in solid lines to that illustrated by dotted lines in Figure 15. Also when strings 30 are under tension a secondary distortion tends to occur in that portion of the top 4 of the instrument disposed between the bridge 27 and sound hole 24. The strings 30 under tension tend to pivot the transversely disposed bridge 27 on its upper longitudinal junction with the top 4 toward the sound hole 24, with the portion 4a of the instrument top seeking to move upwardly (see Figure 11), and the top portion 4b being urged to assume the concave position shown by dotted lines. This secondary concave position which the top portion 4b tends to assume is defined by dotted lines in Figure 12.*

*The novel structure of my invention as previously described in detail, enables the instrument to successfully resist both such primary and secondary tendencies to deform as outlined above, as well as others that may be present when the strings are subjected to tension.*

*The particular structure I employ a body 1, neck 2, top 4, and keyboard 5, all cooperate to prevent the primary tendency of the instrument to assume a concave shape due to string tension. Relative movement between these parts is prevented due to the fact that the bosses 7 adhere to the head 3, bushings 13 transversely engage both the bosses and head, and flanges 8 engage the interior of both the neck 2 and side walls 11. Any tendency of the instrument to buckle in a concave manner is avoided as the top 4 and keyboard 5 are subjected to longitudinal compression. The neck 2 is affixed to side wall portion 36, as may be seen in Figure 2, and the torsional forces exerted by strings 30 tend to pivot the neck in a counterclockwise direction. It will be particularly noted that the stresses to which side wall 36 may be subjected are successfully resisted by the longest of tse stiffeners 17. The portion of stiffener 17 within the confines of body 1 is under compression when the instrument is subjected to string tension, preventing any pivotal movement of side wall 36.*

*Appreciable deformation of the neck 2 is resisted by the keyboard 5 and the longer of the stiffeners 17 when they are under compression. The possibility of the head 3 and neck 2 appreciably altering their normal positions relative to one another when the instrument is under tension is avoided by the cooperative action of the three stiffeners 17 and the keyboard 5. The possibility of head 3 or neck 2 twisting along their longitudinal axes as shown in dotted lines in Figure 15, is prevented by the concerted resistance of stiffeners 17, side wall 36, and rib top 18.*

*The particular construction of my bridge 27 is of the utmost importance, as first, it permits the top and bridge to be made as an integral unit, eliminating rattling or buzzing due to vibration; second, it provides an easy and convenient means for affixing the knotted ends of the strings to the instrument; and third, it assists in reinforcing the top 4 against distortion when subjected to string tension.*

*In Figures 11, 12 and 13, the positions the top 4 and side wall 11 tend to assume when subjected to the force of strings 30 is shown in dotted lines. However, the top portions 4a and 4b adjacent the bridge are prevented from being so displaced due to the channel-shaped cross-section of the bridge which provides a stiffening action. In addition, it will be noted that the flanges 8 cooperate with the transversely disposed bridge 27 to prevent deformation of the top portions 4a and 4b. As shown in Figure 10, flanges 8 are disposed within the confines of side walls 10. For there to be any appreciable downward movement of the top portion 4b, flanges 8 must pivot outwardly as shown in Figure 13, but such outward movement is prevented by the flanges being disposed within the confines of the side walls and bonded thereto. Thus, due to the stiffening action of bridge 27 and flanges 8, the top 4 cannot appreciably distort when tension is applied to strings 30.*

*As a precautionary measure against deformation of top 4, I have found it desirable to use the*

*reinforcing ribs 23, 24, 25 and 26 shown in Figure 5.*

The playing of my musical instrument construction, as shown in Figures 1 and 2 of the drawings, is conventional, and it will be here noted that the hollow neck of the instrument provided by the arcuate cross-section neck portion 2 of the body casting 1 promotes proper balance of the instrument during playing, and thereby provides a certain ease of handling of the instrument by the left hand during the fingering of the strings on the frets 32, shown best in Figure 2 of the drawings.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a musical instrument construction, a body casting having an arcuate in cross-section neck integral therewith and a top casting provided with an integral finger-board thereon, having a flange engageable with the inner side wall of said body casting cemented to said inner side wall, said neck portion and said finger-board portion having head portions integral therewith abutting each other, said finger-board portion, at its head portion, provided with lugs abutting the head portion of said neck portion of said body casting and adhered thereto.

2. In a musical instrument construction, a body casting having an arcuate in cross-section neck integral therewith, and a top casting provided with an integral finger-board thereon, having a flange engageable with the inner side wall of said body casting cemented to said inner side wall, said top casting provided with an integral channel-shaped in cross-section bridge portion, having a plurality of slots therein, having enlarged opening portions at the rear of said channel-shaped in cross-section bridge portion, said neck portion of said body casting having longitudinal stiffeners therein, one of said stiffeners extending into and integral with the body portion of said body casting.

[3. In a musical instrument construction, a plastic body casting having an arcuate in cross-section neck portion, a body back portion and integral side wall portions, a top casting having an angular flange spaced from the outer edges thereof, engageable with the inner side wall of said body casting and adhered to said inner side wall, said top casting having a finger-board portion integral therewith adhered to said arcuate in cross-section neck portion of said body casting, said finger-board and said neck portion provided with head portions adapted to receive keys.]

4. In a musical instrument construction, a plastic body casting having an arcuate in cross-section neck portion, a body back portion and integral side wall portions, a top casting having an angular flange spaced from the outer edges thereof, engageable with the inner side wall of said body casting and adhered to said inner side wall, said top casting having a finger-board portion integral therewith adhered to said arcuate in cross-section neck portion of said body casting, said finger-board and said neck portion provided with head portions adapted to receive keys, boss portions integral with one of said head portions and adhered to the other of said head portions.

5. In a musical instrument construction, a plastic body casting having an arcuate in cross-section neck portion, a body back portion and integral side wall portions, a top casting having an angular flange spaced from the outer edges thereof, engageable with the inner side wall of said body casting and adhered to said inner side wall, said top casting having a finger-board portion integral therewith adhered to said arcuate in cross-section neck portion of said body casting, said finger-board and said neck portion provided with head portions adapted to receive keys, boss portions integral with one of said head portions and adhered to the other of said head portions, longitudinal and transverse reinforcing ribs integral with the back portion of said body casting, said top casting provided with a sound hole therein, having reinforcing ribs therearound.

6. In a musical instrument construction, a plastic body casting having an arcuate in cross-section neck portion, a body back portion and integral side wall portions, a top casting having an angular flange spaced from the outer edges thereof, engageable with the inner side wall of said body casting and adhered to said inner side wall, said top casting having a finger-board portion integral therewith adhered to said arcuate in cross-section neck portion of said body casting, said finger-board and said neck portion provided with head portions adapted to receive keys, boss portions integral with one of said head portions and adhered to the other of said head portions, longitudinal and transverse reinforcing ribs integral with the back portion of said body casting, said top casting provided with a sound hole therein, having reinforcing ribs therearound, said top casting provided with transverse reinforcing ribs adjacent said sound hole.

7. In a musical instrument construction, a cast instrument top having an integral normally inverted channel-shaped in cross-section bridge thereon, provided with string-receiving slots in one normally vertical side wall thereof communicating with the inner side of said top, said slots having enlarged open portions near said instrument top for receiving string knots.

8. In a musical instrument construction, a cast instrument top having an integral normally inverted channel-shaped in cross-section bridge thereon, provided with string-receiving slots in one normally vertical side wall thereof communicating with the inner side of said top, said slots having enlarged open portions near instrument top for receiving string knots, said channel-shaped in cross-section bridge having a bar at the normally upper side thereof integral therewith, spaced from said slots, over which said strings may be engaged.

9. In a musical instrument construction, a musical instrument neck head, comprising a pair of spaced head portions adhered to each other, one of said head portions having integral hollow bosses abutted and adhered to the other of said head portions, metal bushings extending through said hollow bosses, and keys revolubly mounted in said bushings.

10. In a musical instrument construction, a body casting having an arcuate in cross-section neck integral therewith and a top casting provided with a finger-board thereon having a flange engageable with the inner side wall of said body casting cemented to said inner side wall, said body casting having a back portion and side wall portions and reinforcing ribs at the transition of said back portion and said side wall portions for reinforcing the same.

11. In a musical instrument construction, a body casting having an arcuate in cross-section neck integral therewith and a top casting provided with a finger-board thereon, having a flange engageable with the inner side wall of said body casting cemented to said inner side wall, said body casting having a back portion and side wall portions and reinforcing ribs at the transition of said back portion and said side wall portions for reinforcing the same, said ribs integral with said back portion and said side wall portions.

12. In a musical instrument construction, a body casting having an integral neck portion, and a top casting provided with an integral finger-board fixed to said body casting, said neck portion and said finger-board portion provided with head portions contiguously fixed to each other, one of said head portions provided with integral boss portions adhered to the other of said head portions, said boss portions having openings extending therethrough, and keys in said openings.

*13. In a musical instrument construction: a cast instrument top formed with a sound hole therein; a first downwardly extending flange formed as an integral part of said top and disposed inwardly from the other edges thereof; a second flange formed as an integral part of said top and defining said sound hole; and a bridge of inverted channel-shaped cross-section that is provided with string-receiving slots, with said bridge formed as an integral part of said top, and said bridge and first and second flanges cooperating to minimize distortion of said top when said strings engaging said slots are under tension.*

*14. In a musical instrument construction: a hollow body casting that includes a bottom from which an integral continuous side wall extends upwardly; a neck of arcuate cross-section formed integral with said body and extending outwardly from said side wall; and two oppositely disposed stiffeners that reinforce said neck and body against longitudinal deformation, said stiffeners made integral with said side wall at the portion thereof from which said neck extends, with one of said stiffeners extending into the confines of said body and rigidly joined to said bottom, and the other of said stiffeners extending into said neck and rigidly joined to the interior surface thereof.*

*15. In a musical instrument construction, a hollow body casting having a bottom from which a continuous side wall extends upwardly, an arcuate in cross section neck formed integral with said body and extending outwardly from said side wall, a stiffener formed integral with said side wall and extending into the confines of said body and neck to reinforce said instrument against longitudinal distortion, a head made integral with said neck and disposed on the extremity thereof, said head having a plurality of spaced bores formed therein in which keys may be movably supported, a second longitudinally extending stiffener formed integral with said neck and head to reinforce said neck and head against longitudinal distortion, and a transversely disposed stiffener formed on the interior surface of said neck to reinforce same from twisting on its longitudinal axis.*

*16. In a musical instrument construction, a hollow body casting having a bottom from which a continuous side wall extends upwardly, an arcuate in cross section neck formed integral with said side wall and extending outwardly therefrom, a first stiffener means formed integral with said side wall and extending into the confines of said body and neck to reinforce said instrument against longitudinal distortion, and a head made integral with said neck and disposed at the extremity thereof, said head having a plurality of spaced bores formed therein in which keys may be revolubly supported, a second stiffening means formed integral with said neck and head to reinforce said neck and head against longitudinal distortion, and a third stiffening means formed integral with said neck to reinforce said neck from twisting on its longitudinal axis.*

*17. In a musical instrument construction: a cast instrument top from which an integrally formed keyboard extends; downwardly extending flange means formed as an integral part of said top and keyboard; a bridge of angular cross-section provided with string-receiving slots, said bridge formed as an integral part of said top; a hollow body casting that includes a bottom from which an integral continuous side wall extends upwardly; a neck of arcuate cross-section formed integral with said body and extending outwardly from said side wall; two oppositely disposed ribs formed integral with said side wall at the portion thereof from which said neck extends, with one of said ribs extending into the confines of said body and rigidly joined to said bottom, and the other of said ribs extending into said neck and rigidly joined to the interior surface thereof; and a plurality of keys rotatably supported on the outwardly disposed portions of said neck and keyboard which strings may extend to said bridge when said flange means engage the upper surface portions of said body and neck, with said flange means, said bridge and said ribs cooperating to prevent distortion of said instrument when said strings are placed under tension.*

*18. In a stringed musical instrument construction: a cast instrument top having an integral inverted channel shaped in cross section bridge thereon, said bridge provided with string-receiving slots therein having openings in communication therewith for receiving the knotted ends of strings; a bar extending substantially the longitudinal length of said bridge and disposed on the top thereof, said bar engaged by each of said strings, the knotted ends of which are disposed in said openings, and said bar and bridge serving to couple said strings when vibrating to said top and reinforce the portions of said top adjacent said bridge against appreciable distortion when said bridge is subjected to the tension of said strings; a keyboard extending outwardly from said top and formed as an integral part thereof; a head portion formed integral with said keyboard and disposed at the extremity thereof, said head portion formed with bores therein in which keys may be rotatably mounted; flange means formed integral with said top, keyboard and head portion extending downwardly therefrom; and a lower instrument portion that includes a bottom from which continuous side walls extend upwardly; a neck of arcuate cross section formed integral with said lower instrument portion and extending outwardly from said side wall; a stiffener formed integral with said side wall and extending into the confines of said neck and connected to said bottom for reinforcing purposes; and a head portion formed integral*

*with said neck and disposed on the extremity thereof, said head portion having bores formed therein that are complementary to said bores in said keyboard supported head portion when said flanges engage said side walls, neck, and neck supported head portion in an instrument forming position.*

*19. In a stringed musical instrument construction: a cast instrument top having an integral inverted channel shaped in cross section bridge thereon, said bridge provided with string receiving slots therein having openings in communication therewith for receiving the knotted ends of strings; and an upwardly extending bar formed integral with said bridge and disposed along the upper longitudinally extending portion thereof, said bar engaged by each of said strings, the knotted ends of which engage said openings, and said bar and bridge serving to couple said strings when vibrating to said top and reinforce the portion of said top adjacent said bridge against appreciable distortion when said bridge is subjected to the tension of said strings.*

GEORGE A. FINDER.

REFERENCES CITED

The following references are of record in the file of this patent or the original patent:

UNITED STATES PATENTS

| Number | Name | Date |
|---|---|---|
| 431,722 | Kopp | July 8, 1890 |
| 601,071 | Borcur | Mar. 22, 1898 |
| 629,374 | Kindig | July 25, 1899 |
| 1,170,999 | Schultz | Feb. 8, 1916 |
| 1,636,133 | Horton | July 19, 1927 |
| 1,668,832 | Swanson | May 8, 1928 |
| 1,834,804 | Puoina | Dec. 1, 1931 |
| 1,881,229 | Young | Oct. 4, 1932 |
| 2,186,424 | Moertel | Jan. 9, 1940 |
| 2,597,154 | Maccaferri | May 20, 1952 |

FOREIGN PATENTS

| Number | Country | Date |
|---|---|---|
| 49,788 | Germany | Nov. 26, 1940 |

OTHER REFERENCES

"Acrylic Resins Find Industrial Applications," Chemical and Metallurgical Engineering, September 1937, vol. 44, No. 9, pages 468–471.